United States Patent [19]

Duncan

[11] 4,165,596
[45] Aug. 28, 1979

[54] APPARATUS AND METHOD FOR SIMULTANEOUSLY CUTTING TWO ROWS OF CANE AND PILING FOUR ROWS OF CUT CANE ON TWO ROWS

[76] Inventor: Richard A. Duncan, 123 Len Ct., Thibodeaux, La. 70301

[21] Appl. No.: 827,524

[22] Filed: Aug. 25, 1977

[51] Int. Cl.² .......................................... A01D 45/10
[52] U.S. Cl. ..................................... 56/14.3; 56/192; 56/DIG. 2
[58] Field of Search ................. 56/14.3, 192, DIG. 2, 56/14.5, 13.9

[56] References Cited

U.S. PATENT DOCUMENTS

| | | | |
|---|---|---|---|
| 2,427,313 | 9/1947 | Thomson | 56/192 |
| 2,669,829 | 2/1954 | Pugh | 56/14.5 |
| 3,090,183 | 5/1963 | Thomson | 56/DIG. 2 |
| 3,095,679 | 7/1963 | Pugh et al. | 56/192 |
| 3,448,564 | 6/1969 | Chauffe | 56/14.3 |
| 3,475,886 | 11/1969 | Hart | 56/DIG. 2 |
| 3,583,135 | 6/1971 | Broussard | 56/14.3 |
| 3,613,336 | 10/1971 | Smith | 56/192 |

Primary Examiner—Jay N. Eskovitz
Attorney, Agent, or Firm—James B. Lake, Jr.

[57] ABSTRACT

Two pairs of cane gatherers are mounted forwardly on a four-wheeled power train, for driving a plurality of constant and variable volume hydraulic pumps, the cane gatherers being provided with gathering chains for holding and moving cane through a pair of cane passageways defined thereby and by sticker and moving chains mounted for endless rotation for guiding two rows of cane to cane toppers and cutters mounted in each passageway, and then to a pair of articulated pilers mounted on the rear of the power train. Cut-cane passageways through the pilers are defined by cane moving chains and rub bars. The pilers in one articulated position lay the cut cane of one row just behind the cut cane of the second row in a continuous transverse windrow across the cut rows and behind the power train and in a second articulated position lay the cut cane across adjacent cut rows. Front wheels are pivotable up to 90° and are tied together by tackle and pairs of differential drums that pivot an inboard wheel in turns up to 90° and an outboard wheel up to 45° and, with independently applicable rear wheel brakes, produce a minimal turning radius of approximately an apparatus length. Differential level control of variable volume pumps respectively powering power train wheels and cane-moving chains, conform an infinite ratio of speeds to the state and direction of windblown cane. The constant volume pumps power hydraulic cylinders to position cane gatherers, position and rotate cutters and toppers, position the pilers articulation and pivots the power train front wheels.

7 Claims, 7 Drawing Figures

APPARATUS AND METHOD FOR SIMULTANEOUSLY CUTTING TWO ROWS OF CANE AND PILING FOUR ROWS OF CUT CANE ON TWO ROWS

BACKGROUND OF THE INVENTION

The invention is related generally to harvesters, and more particularly to the apparatus and method of cutting cane two rows at a time and the piling four rows of cut cane transversely across two cut rows in continuous windrows.

The prior art teaches multiple row harvesters blowing chopped forage into following trailers, and single row harvesters piling two cut rows in longitudinal windrows. Reference is made to the following U.S. patents: B. C. Thompson, U.S. Pat. No. 3,002,330; H. J. Chauffe, U.S. Pat. No. 3,448,564; V. P. Broussard, U.S. Pat. No. 3,481,121; and J. D. Segredo, U.S. Pat. No. 3,654,752.

SUMMARY OF THE INVENTION

An object of the invention is to provide apparatus and method of harvesting cane using only 60% of the energy heretofore used to harvest the same amount of cane.

Another object of the invention is to provide continuous windrows of four rows of cut cane across two cut rows for easy pickup without tops and no wheel travel between said two rows;

Another object of the invention is to provide a turning radius of harvesting apparatus of about one length thereof;

Still another object of the invention is to provide differential speed control means for the power train and cane-moving means relative to the state and direction of windblown cane.

DETAILED DESCRIPTION OF THE INVENTION

Figure 1:
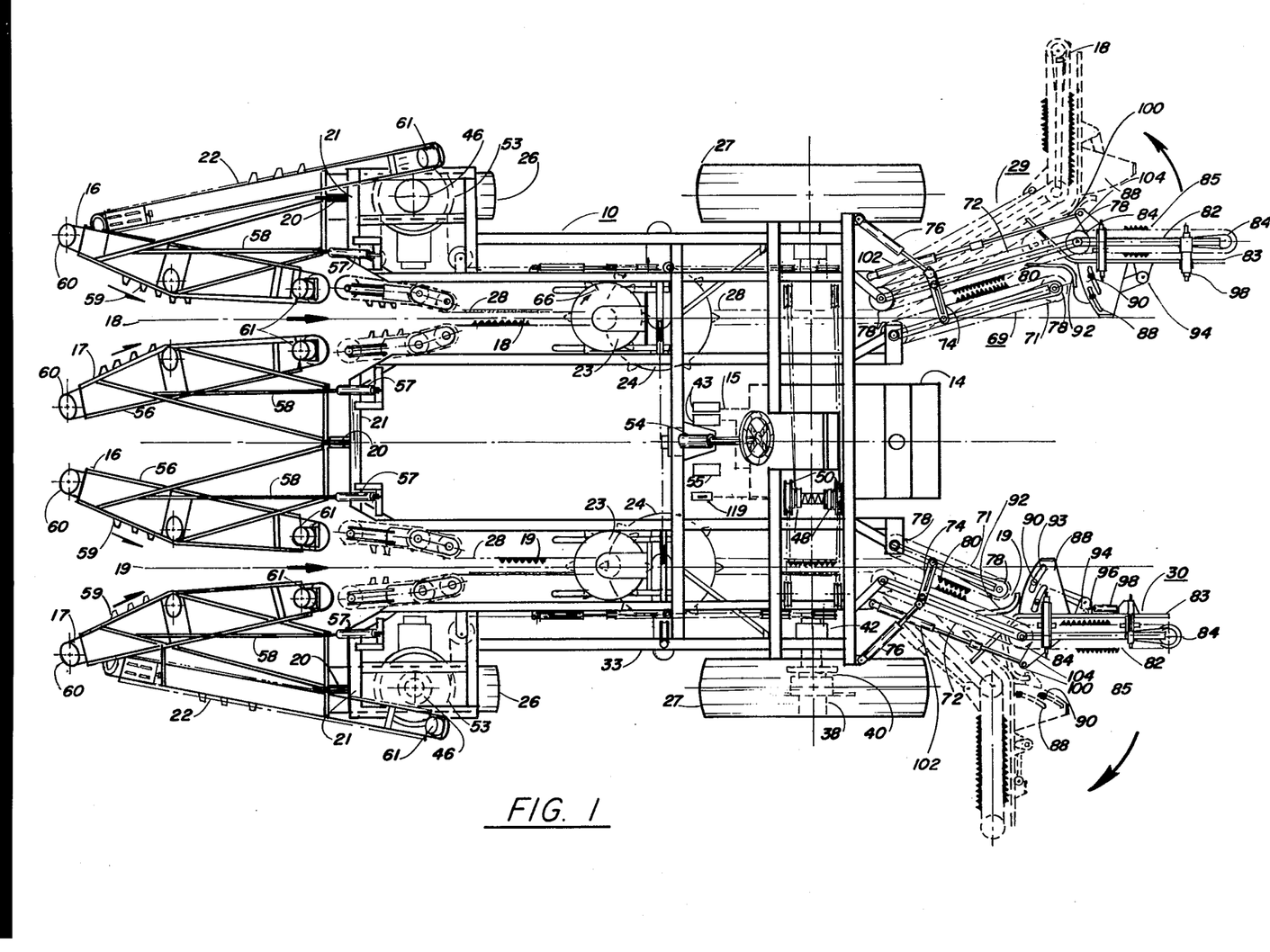
FIG. 1 is a plan view of the invention.
Figure 2:
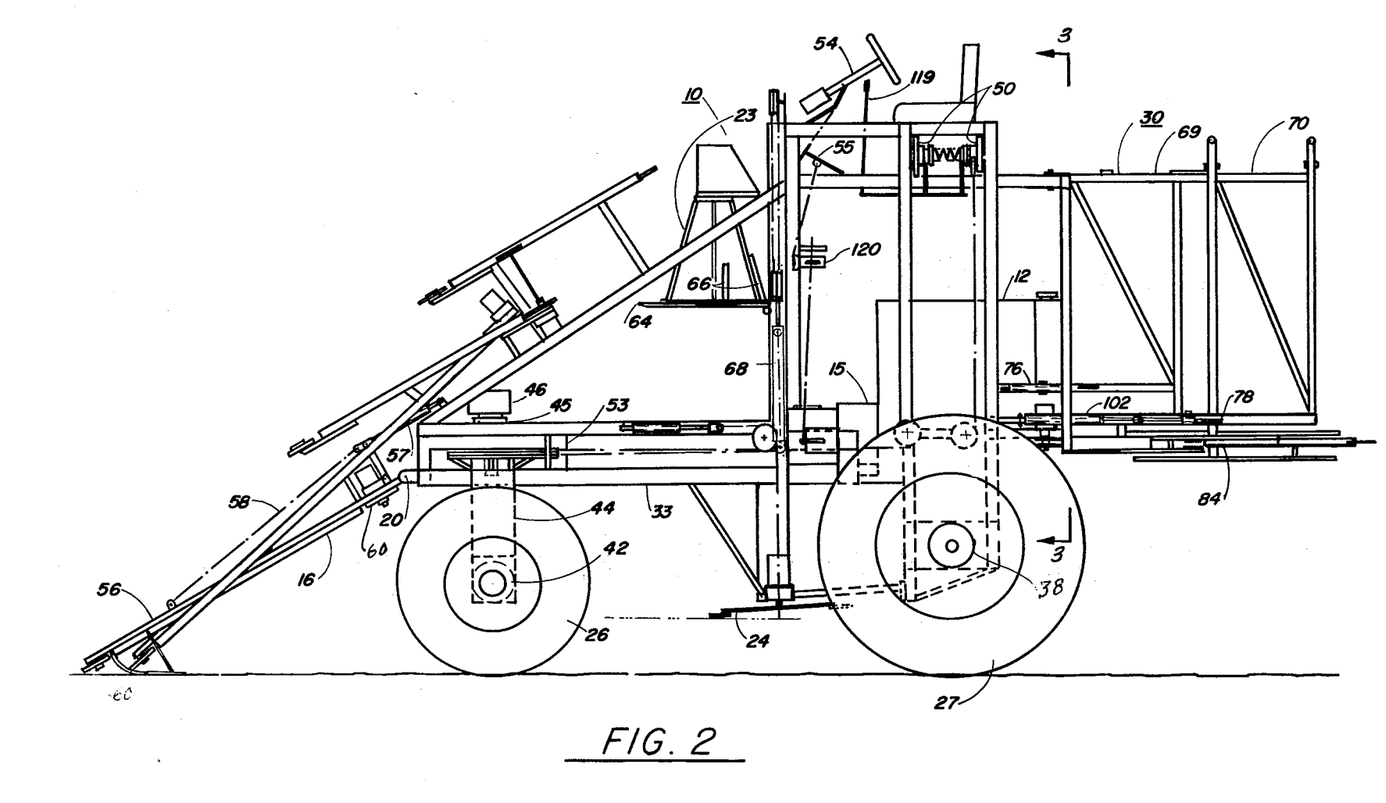
FIG. 2 is a side elevation of the invention.
Figure 3:
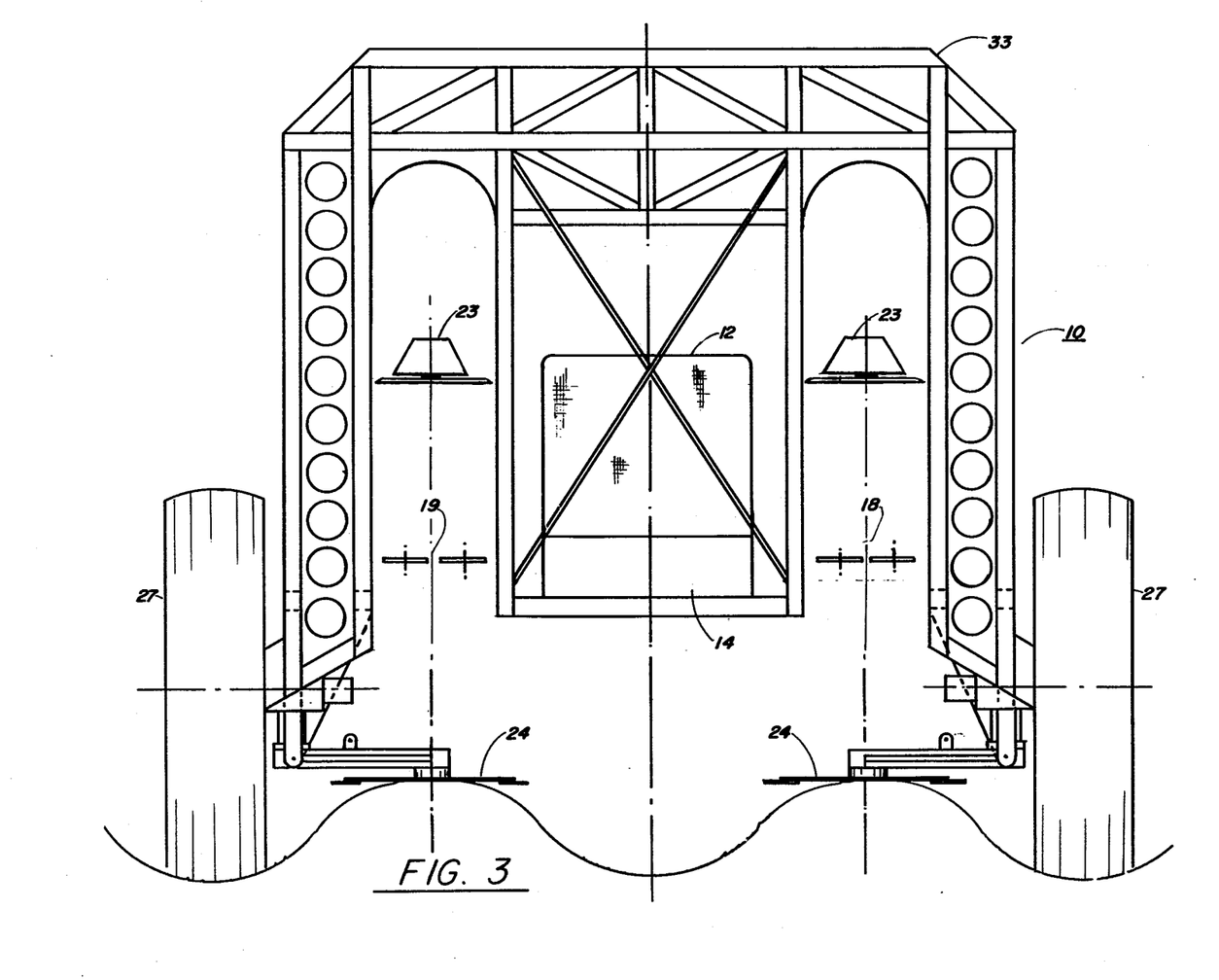
FIG. 3 is a rear view of the invention.

Referring to FIGS. 1-3, the invention comprises a four-wheeled power train 10 having a centrally mounted internal combustion engine 12 for driving constant volume pumps 14 and variable volume pumps 15 that provide hydraulic power to run and control the apparatus. Two pairs of cane gatherers 16 and 17, which respectively defines with gathering chains mounted therein the front portion of respective paths 18 and 19 for two rows of cane, are pivoted by pivots 20 to the front 21 of power train 10 for the simultaneous raising and lowering of said pairs of cane gatherers 16 and 17.

Additional cane gatherers 22 are mounted outboard of cane gatherers 16 respectively for engaging any windblown cane from adjacent rows and righting it clear of the apparatus. A pair of cane toppers 23 and cutters 24 are mounted intermediate the front wheels 26 and rear wheels 27 for topping and cutting the cane of two rows gathered into passageways 18 and 19. Center cane carrier chains 28 engage cane from the gatherers to lead it to the toppers and cutters, and from there moves the cut cane rearward to a pair of articulated pilers 29 and 30 pivoted to the rear of the power train 10. The pilers discharge the cane from a first articulated position to the rear and transversely across the two rows being cut in continuous windrows, one said row of cut cane behind the other. From a second articulated position, the pilers 29 and 30 discharge the cut cane behind and to respective sides of the apparatus transverse the adjacent cut rows.

Figure 4:
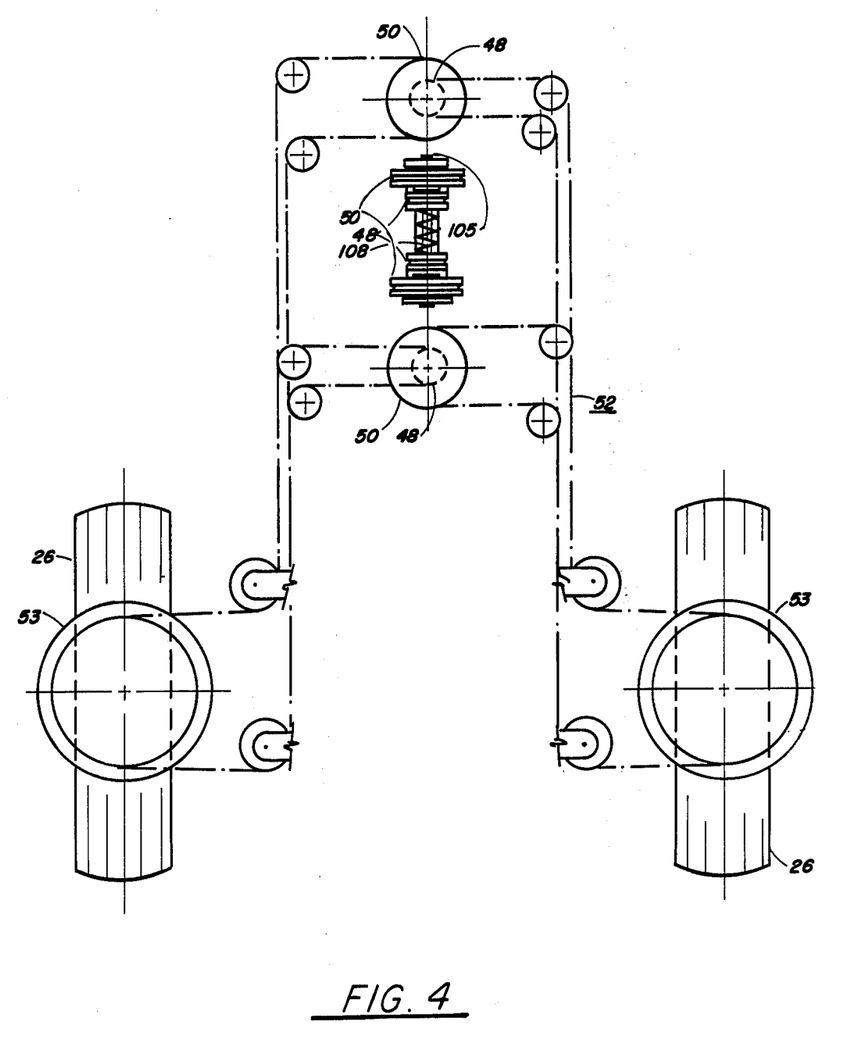
FIG. 4 is a diagrammatic sketch of the apparatus and method of tying the front wheels together for coordinated differential pivoting in turns.

Power train 10 comprises a rectangular frame 33 defining two longitudinal cane passageways in continuation of passageways 18 and 19 that begin between each of the pairs of cane gatherers 16 and 17, said frame being supported on the two front wheels 26 and the two rear wheels 27. Rear wheels 27 are mounted for rotation on planetary hubs 38 fixed to said frame and have brakes 40 and hydraulic driving motors 42. Brakes 40 are respectively connected to independent foot pedals 43 that are operable jointly and separately. Each of the front wheels 26 is mounted for rotation on a hydraulic driving motor 42 fixed to a depending member 44. A spindle 45 is fixed to the top of each member 44 for pivoting said member to said frame 33. Hydraulic rotary activators 46 are respectively fixed to the tops of said spindles and to frame 33 for respectively pivoting depending members and associated front wheels for turning. Referring further to FIG. 4, pulleys 53 are fixed to the tops of respective depending members 44 and are connected through one of two pairs of differential drums 48 and 50 by means of tackle 52 to tie the two front wheels together for simultaneous and differential pivoting on respective spindles 45. The manually operated steering wheel 54 hydraulicly activates rotary activators 46 which provide torque to pivot the front wheels in turns to right and left depending upon which of the two pairs of differential drums is connected to said front wheels for an inboard wheel to turn up to 90° and an outboard wheel to turn up to 45° in maximum turns, as more fully described hereinafter. In steering the pivoting of the front wheels can be coordinated with braking a back wheel for turning the apparatus in its own length by pivoting on the braked rear wheel. Wheel drive motors 42 are powered by variable volume pumps 15 activated by a single control pedal 55 mounted adjacent brake control pedals 43.

Figure 7:
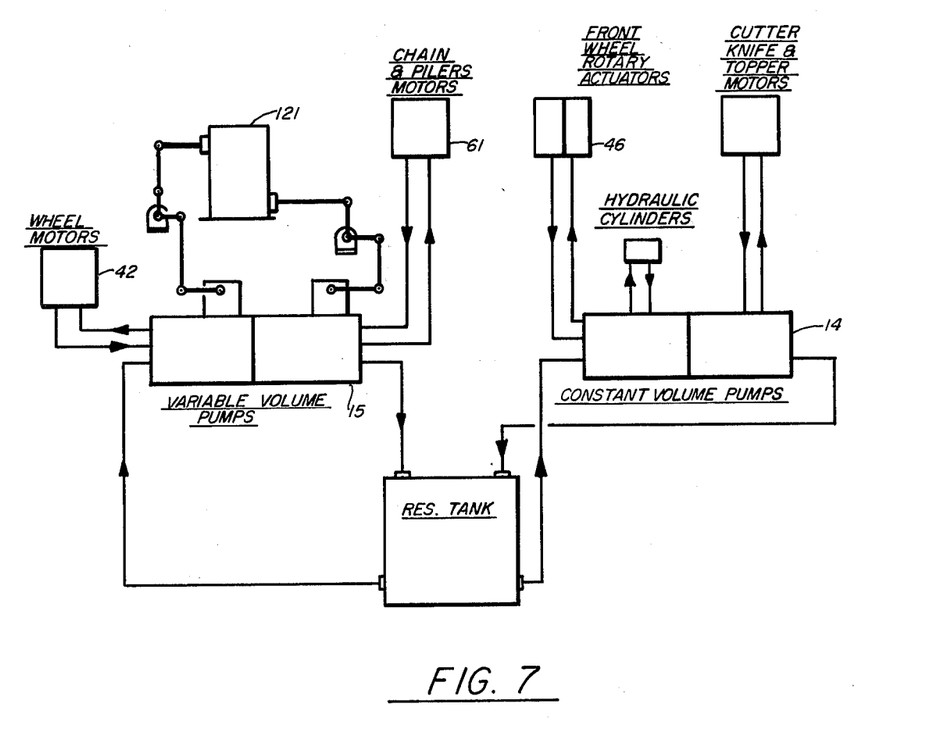
FIG. 7 is a diagrammatic sketch of the hydraulic power system.

The pairs of cane gatherers 16 and 17 comprise gathering frames 56 individually pivoted to the front of the power train, said frames being separately and/or jointly raised and lowered by hydraulic cylinders 57 and cables 58 and actuated by constant volume pumps 14 (see FIG. 7). Gathering chains 59 are mounted therein for endless rotation on sprockets 60 driven by hydraulic motors 61 from a variable volume pump 15.

The pair of cane toppers 23 comprise conic frustums mounted small end up for opposite rotation with circular knives fixed to the bottoms thereof for severing the cane tops, and deflector strips 66 fixed on the sides thereof deflect the severed top outboard of the respective two rows being harvested. The toppers are simultaneously movable vertically by hydraulic cylinder 68 supplied from the constant volume pumps 14.

The pair of articulated pilers 29 and 30 each comprises a primary part 69 and a secondary part 70 pivoted together end to end, and each comprising longitudinal members spaced parallelly apart to define therebetween a continuation of cane paths 18 and 19 respectively. The longitudinal members of piler 29 are longer than those of piler 30 in order for the pilers to sequentially pile cane in continuous windrows without the discharged cane from one piler interfering with that of the other piler as each discharges its cut cane across the same two rows from which it was cut. Pilers 29 and 30 are pivoted to the back of frame 33 and respectively continue paths 18 and 19 of center cane carrier chains 28. Longitudinal members 71 and 72 of each of the primary parts 69 are parallely linked by linkages 74, each of which are pivoted to a respective rod end of hydraulic cylinders 76 which are pivoted to the back end of frame 33 for respectively swinging said members 71 and 72 outwardly and inwardly. Sprockets 78 are mounted for rotation on the respective ends of members 71 and 72 for rotating endless sticker chains 80 to move rearwardly therebetween cut cane from the center carrier chains 28. Longitudinal members 82 of secondary parts 70 each have sprockets 84 mounted on the respective ends thereof for rotating respective sticker chains 85 endlessly therearound, and respective rub bars 83 linked parallely therewith and having an inboard end curved around respective inboard sprockets 84 to define respective paths therebetween for cut cane. A double slotted roller guide 88 is fixed to each rub bar 83, and a second double rub bar 92 is fixed thereto by rollers 90 and positioned by pivotal angular links 94 actuated respectively by rod ends 96 of hydraulic cylinders 98, each fixed to a rub bar 83. The rub bars 92 are each curved to intercept cane from the primary parts 69 and deflect it inwardly and transversely behind the apparatus when each of the secondary parts 70 are extended rearwardly by rod ends 100 of hydraulic cylinders 102 that are pivoted between the end of frame 33 and respective lugs 104 fixed to respective longitudinal members 82. When hydraulic cylinders 76 and 102 have the respective rod ends retracted, the primary and secondary pilers of each pair of pilers are pivoted outboard and the curved ends of rub bars 83 intercepts the cut cane from the primary parts 69 and carries it outboard and transversely across two adjacent rows from the ones being cut.

Figure 5:
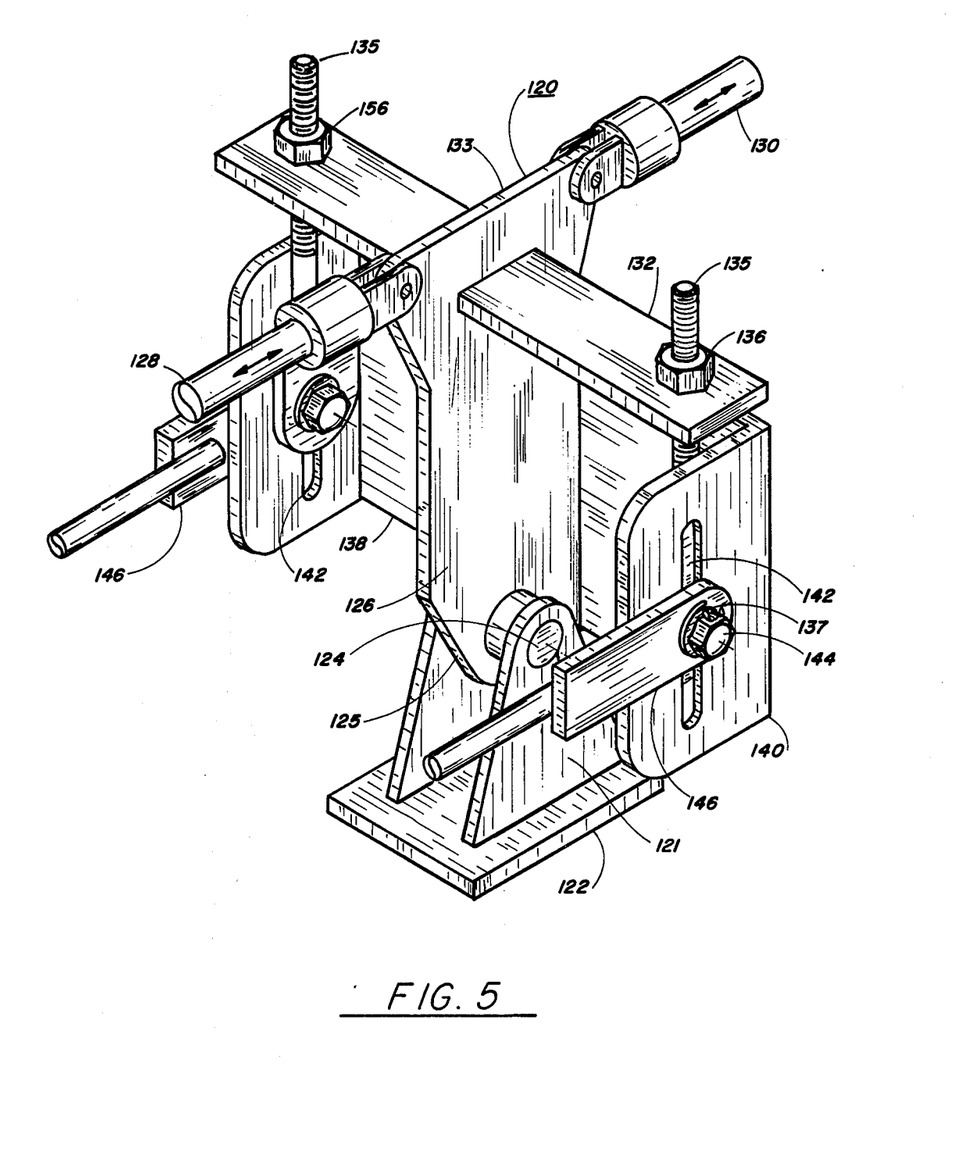
FIG. 5 is an enlarged three dimensional view of an adjustable differential speed control for adjusting an infinite ratio of relative speeds of power train and cane moving chains to the state and direction of windblown cane.
Figure 6:
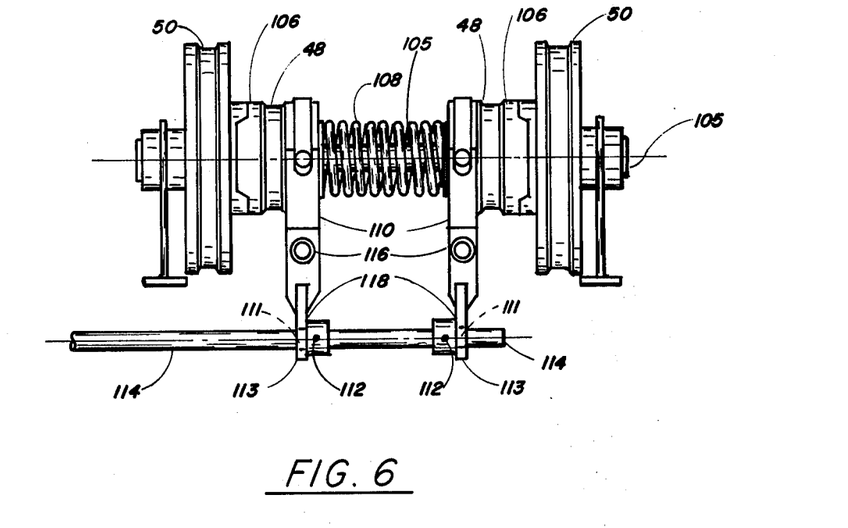
FIG. 6 is an enlarged side elevation of the differential drums of FIG. 4 and controls.

Referring now to FIGS. 4 and 6, differential drums 48 and 50 are arranged in pairs at the ends of a stationary axle or shaft 105 for rotation thereon, the drums 48 and 50 of each pair being engageable to each other by respective dog clutches 106, one or the other pair being kept in engagement by a spring 108 mounted on said shaft between the two pairs of drums and a two-position control rod 114. Straps 110 are fixed respectively to the inboard drums 48 of each pair of drums and depend therefrom to define aligned holes 111 through their respective free ends 113, through which said two-position control rod 114 is slidably mounted. The straps are respectively pivoted on pivots 116 intermediate holes 116 and shaft 105. Two stops 118 are adjustably secured by set screws 112 to said control rod 114 on the inboard sides of said strap ends 113, and adapted when said control rod is pulled to pivot the left strap and declutch the left differential drums shown on FIG. 6 for steering with the steering wheel to the right for a maximum turn of the right or inboard wheel 90° and the left or outboard wheel 45°. Pushing said control rod 114 separates the right differential drums for similarly steering to the left. A control lever 119 is pivotally mounted adjacent steering wheel 54 and pivotally connected to control rod 114 for effecting the two-position push-pull operation manually in cooperation with turning the steering wheel.

for synchronizing the ground speed of the power train with the chain speed of the cane-moving chains relative to the erect state of the cane in the field, is mounted between control pedal 55 and variable volume pumps 15 and comprises a base 122 and fixed bracket 121 connected by pivot 124 to a lower end of a plate member 126, the upper free end of which engages oppositely disposed linkages 128 and 130 extending normal to pivot 124 and spaced therefrom by a fixed distance, said linkages being respectively connected with the ground speed control pedal 55 and the other end connecting with variable volume hydraulic pumps 15 supplying power to wheel motors 42. A transverse member is fixed through and adjacent to the free end of plate member 126 to extend parallel with pivot 124 and spaced vertically therefrom. Two bolts 135 respectively extend through and depend from holes in the respective ends of transverse member 132 and are adjustably secured thereon by nuts 136 engaging complementary threads of the upper ends of said bolts. The lower ends of said bolts 135 are flattened and define bolt holes 137 parallel to said transverse member 132. A channel member 138 has side parts 140 that are respectively slotted vertically to register with bolt holes 137 and to pivotally engage by pivot bolts and nuts 144 the ends 146 of linkages to variable volume pumps 15 supplying power to hydraulic motors (not shown) that rotate pickup and gathering chains 22 and 59, center chains 28, and piler chains 80 and 85. Bolts 136 adjustably support and space pivot nuts and bolts 144 from linkages 128 and 130, a distance made proportional by bolts and nuts 135 and 136 to any desired ratio of ground and chain speeds suitable to the windblown condition and direction of the cane.

Referring to FIG. 7, the variable volume pumps 15 supply power to all wheel driving motors and chain rotating motors through variable speed control 121, and the constant volume pumps 14 supply power to all hydraulic cylinders, hydraulic front wheel rotary actuators and steering wheel, and cane cutter and toppers motors.

In use, the apparatus cuts two rows at a side of a field, it then skips two rows to cut two more rows therebeyond and so on to the other side of the field. The pilers which have been set in a first articulated positions, for transversely piling cut cane in back of the apparatus and across the two cut rows, are now changed to a second articulated position, and the apparatus sequentially cuts the skipped rows two at a time and piles the cut cane therefrom across the two cut rows adjacent the rows then being cut. Four rows are thereby piled across two rows in a continuous windrow that is easy to pick up by a fork loader for loading on a vehicle to take the cut cane to a mill. The severed cane tops and the apparatus wheels do not invade between the rows supporting windrows of cut cane, for cleaner and less contaminated cane pickups.

What is claimed is:

1. Cane cutting and piling apparatus for harvesting cane comprising:

(a) an hydraulic four-wheel drive power train means having pairs of transversely spaced front and back wheels adapted to span two rows of can including an inter-row space therebetween, with said pairs of front and back wheels engaging in inter-row spaces adjacent said two spanned rows for rolling up and down a cane field, two rows at a time, said power train means mounting opposed and oppositely rotatable cane engaging means arranged to define a pair of cane passageways through said power train means and in alignment with said spanned two rows for passing cane along said passageways;

(b) two pairs of cane gathering means, pivoted to a front end of said power train means for vertically adjusting the free ends thereof, and mounting opposed and oppositely rotatable cane engaging means arranged to define a pair of cane passageways in continuation of said cane passageways of said power train means for simultaneously engaging two rows of cane therein;

(c) cane cutting and topping means slidably mounted for rotation in said cane passageways of said power train means for cutting and topping the cane passing therethrough at adjustable heights;

(d) a pair of articulated piler means, pivoted to a back of said power train means for horizontally adjusting the free ends thereof in two cane discharging positions, said piler means mounting opposed and oppositely rotatable cane engaging means arranged to define a pair of cane passageways in continuation of said power train means cane passageways for simultaneously discharging and piling the cane engaged therein across the rows from which cut, in one of said two cane discharging positions, and across two adjacent rows on each side of the two rows from which the cane is cut in another of said two cane discharging positions;

(e) steering means mounted on said power train means for pivoting said pair of front wheels differentially in a direction of turn;

(f) differential speed control means mounted in said power train for adjusting speed of rotation of said cane engaging means relative to speed of rotation of said four wheel drive of the power train means in an infinite range of rations to compensate for a windblown condition and direction of cane that affect cane gathering and pickup; and (g) power means mounted in said power train means for the operation and control of all aforesaid means.

2. Cane cutting and piling apparatus as described in claim 1 wherein said hydraulic four-wheel drive power train means comprises:

(a) independently operable brakes mounted on said rear wheels for pivoting said power train on a braked rear wheel in sharp turns;

(b) depending members respectively mount front wheels for rotation at ends and spindle the other ends over respective front wheel centers to a front end of said power train means;

(c) rotary actuators respectively mounted on said front end and adapted to pivot said depending members and front wheels around the respective spindles in turns by said steering means;

(d) an internal combustion engine mounted on the back of said power train for providing primary power;

(e) variable volume pumps mounted on one end of said internal combustion engine and driven thereby for supplying power to said four-wheel hydraulic drive and to rotate all cane engaging means; and (f) constant volume pumps mounted on another end of said internal combustion engine and driven thereby for supplying power to operate and control all means, other than those stated above, rotationally, pivotally and slidably mounted on said power train.

3. Cane cutting and piling apparatus as described in claim 1 wherein said two pairs of cane gathering means comprise:

(a) oppositely disposed and oppositely rotating cane pickup, separating and righting means fixed to respective outer cane gathering means of said two pair of gathering means for picking up, separating and righting cane from rows adjoining those being cut.

4. Cane cutting and piling apparatus as described in claim 1 wherein said cane cutting and topping means comprise:

(a) a pair of conic frustums rotationally mounted with small ends uppermost in said cane passageways defined through said power train means;

(b) circular knives mounted on the respective large ends of said conic frustums for cutting cane tops of cane passing through said cane passageways; and (c) a plurality of radially projecting ridges extending upwardly from said large ends of said conic frustums for engaging cut cane tops leaning on said conic frustums and throwing said tops into respective inter-row spaces outwardly of the pair of rows being piled to the rear, and inwardly of the rows being piled to the sides.

5. Cane cutting and piling apparatus as described in claim 1 wherein said pair of piler means comprise:

(a) primary parts, one longer than the other, are pivoted by respective ends to the rear of said power train means;

(b) secondary parts are respectively articulated end to end with said primary parts;

(c) two double rub bar means are fixed to each of said secondary parts; a shorter rub bar means, adapted to intercept the cane passageways at the respective ends of the primary parts, directs the cane to inward discharge therefrom, the cane from the longer primary part discharging behind the cane discharged from the other shorter primary part with no interference therebetween, when said primary and secondary parts are extended rearwardly in said first position; a longer rub bar means adapted to continue the cane passageways of the primary parts when said primary and secondary parts are pivoted outwardly in said second position to discharge outwardly from the ends of said second parts across adjacent rows.

6. Cane cutting and piling apparatus as described in claim 1 wherein said steering means comprises:

(a) steering wheel means connected hydraulically between said power means and said front wheel means to pivot actuating means for pivoting said front wheel means in turns;

(b) two similar pairs of differential drums of any desired differential radius ratio mounted for rotation on a fixed shaft, the differential drums of each said pair biased to clutch together subject to alternative declutching of one pair in a turn in one direction, and the other pair in a turn in the other direction; and (c) tackle connecting both pairs of differential drums in a reverse sequence of the differential drums of each said pair to tie said front wheel means together for differential turns in both directions with a wheel of said front wheel means in the direction of turn pivoting a greater amount by the ratio of said differential radii than the other of said front wheel means, whereby said steering wheel means controls the amount of pivoting of such front wheel means, and said differential drums control the relative amount each said wheel pivots with respect to the other of said front wheel means.

7. Cane cutting and piling apparatus as described in claim 1 wherein said differential speed control means comprises:

(a) oppositely disposed linkages pivoted to a base spaced a fixed distance from said linkages, and connected respectively to operator controls and to power means supplying hydraulic power to said four-wheel hydraulic drive; and (b) parallel linkages connected respectively to cane engaging means of said gathering means, power train means and piler means, pivoted to said base an adjustable distance spaced between said base and said oppositely disposed linkages for providing any desired ratio between a ground speed of said power train means and a speed of said cane engaging means relative to the windblown condition and direction of the cane being cut for said cane to be picked up and vertically righted by the time it reaches said cutting and topping means.

* * * * *